Nov. 30, 1965   W. F. LODDING ETAL   3,220,618
METERED LIQUID DISPENSING CLOSURE
Filed April 7, 1964

INVENTORS
WILLIAM F. LODDING,
WILLIAM A. CHAMBERS
& MINDAUGAS J. KLYGIS

BY Mason, Porter, Diller & Stewart
ATTORNEYS

United States Patent Office 3,220,618
Patented Nov. 30, 1965

3,220,618
METERED LIQUID DISPENSING CLOSURE
William F. Lodding, Orland Park, William A. Chambers, Harvey, and Mindaugas J. Klygis, Chicago, Ill., assignors to Continental Can Company, Inc., New York, N.Y., a corporation of New York
Filed Apr. 7, 1964, Ser. No. 357,901
20 Claims. (Cl. 222—416)

This invention relates to a novel plastic dispensing closure for dispensing a metered quantity of liquid from a container with which the closure is associated and is particularly characterized by being constructed from a maximum of two mold plastic members joined together in sealed relationship.

Heretofore it has been conventional to form closures for dispensing a metered quantity of liquid from a plurality of different elements constructed from a different material and securing these elements together by a plurality of fastening means. Such constructions necessarily resulted in conventional dispensing closures which are relatively intricate in both design and assembly, and are therefore relatively expensive to manufacture. For example, it is conventional to form such dispensing closures from as many as twelve or more separate elements including such elements as individual vent tubes, dispensing tubes, siphon tubes, whole or partial housing members, gasket members, separate caps, hinge pins for securing caps to the dispensing tubes, means for securing partial housing members together, etc.

It is, therefore, an object of this invention to provide a novel dispensing closure for dispensing a metered quantity of liquid which is relatively simple in construction, assembly and operation, and which overcomes substantially each of the inherent disadvantages in cumbersome, expensive, multi-element conventional dispensing closures.

A further object of this invention is to provide a novel plastic dispensing closure for dispensing a metered quantity of liquid, the closure being characterized in a maximum two-piece construction and including a housing defining an inner liquid chamber, a vent tube and a dispensing tube integrally formed as portions of the housing, at least the dispensing tube projecting outwardly of the housing for dispensing liquid from a container with which the closure is associated, both the vent tube and the dispensing tube having end portions terminating in the housing, a second element including a partition member closing the chamber, the partition member including a siphon tube surrounding a portion of the dispensing tube, an opening both in the dispensing tube and the partition member, and means for securing the closure to a container whereby a measured amount of liquid in the container will be dispensed therefrom upon the inverting of the container.

A further object of this invention is to provide a novel dispensing closure of the type immediately above described including an integral overcap, the overcap being hinged to the housing for pivotable movement to a position overlying at least the end portion of the dispensing tube projecting outwardly of the chamber, and means carried by the overcap to close off and seal the dispensing tube whereby liquid is precluded from inadvertently or accidentally flowing from the container.

Still another object of this invention is to provide a novel dispensing closure for dispensing a metered amount of liquid from a container to which the closure is attached including a housing defining an inner liquid chamber, a vent tube and a dispensing tube opening into the chamber, a partition member closing the chamber, a siphon tube surrounding a portion of the dispensing tube, an opening in the partition member opening into the siphon tube, another opening in the partition member opening into the chamber, means for securing the dispensing closure to a container, and the closure being constructed from a maximum of two integral molded plastic members securely joined together.

A further object of this invention is to provide a novel plastic dispensing closure of the type immediately above described in which an overcap is hingedly connected to the housing, the housing including means engageable with means on the overcap for securing the overcap in overlying relation to the end wall, a cooperable lockable bead and groove forming respective portions of the overcap and housing for securing the overcap in overlying relationship to an end wall of the closure through which the vent and dispensing tubes project, and a pair of continuous wall portions carried by the overcap and adapted to surround the portions of the vent and dispensing tubes projecting beyond the end wall of the housing whereby fluid is precluded from accidental or inadvertent flow from the container upon the same being inverted.

A further object of this invention is to provide a novel dispensing closure of the type just described in which both the vent tube and the dispensing tube are sealed at the end portions thereof projecting outwardly of the liquid chamber and are adapted to be severed prior to the initiation of a dispensing operation.

With the above, and other objects in view that will hereinafter appear, the nature of the invention will be more clearly understood by reference to the following detailed description, the appended claims and the several views illustrated in the accompanying drawing.

Figure 1:
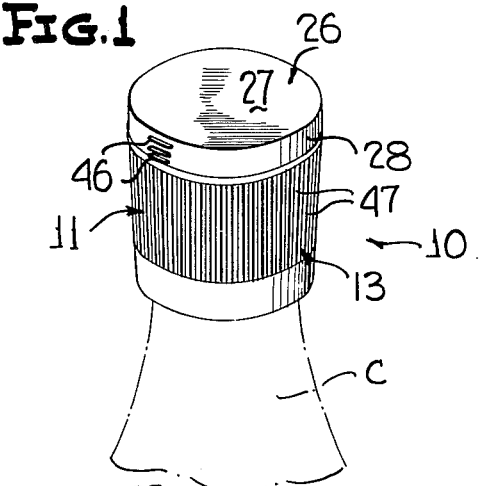
FIGURE 1 is a top perspective view of a novel plastic dispensing closure constructed in accordance with this invention, and illustrates the closure attached in the closed position thereof to the finish of a bottle.

A novel dispensing closure for dispensing a metered quantity of liquid is best illustrated in FIGURES 1 through 5 of the drawing, and is generally designated by the reference numeral 10. The dispensing closure 10 is preferably constructed from plastic material, such as polyethylene, polystyrene or similar thermoplastic material and is preferably formed by a conventional injection molding process.

Figure 5:
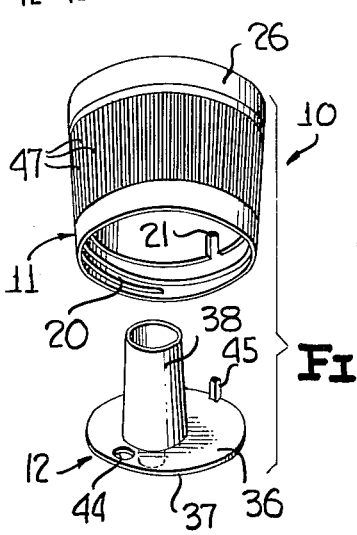
FIGURE 5 is a perspective exploded view of the closure of FIGURES 1 through 4 of the drawings, and illustrates the non-assembled condition thereof.

The dispensing closure 10 is of a two-piece construction including an outer member or element 11 and an inner member or element 12 (FIGURE 5).

Figure 3:
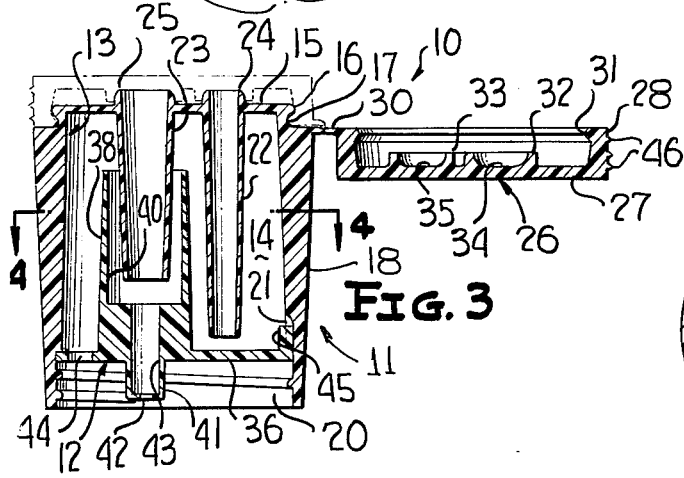
FIGURE 3 is an enlarged sectional view taken along line 3—3 of FIGURE 2, and illustrates the structural arrangement of the dispensing closure.
Figure 4:
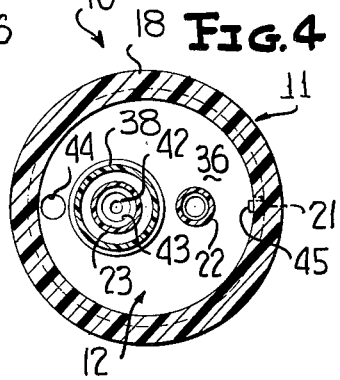
FIGURE 4 is a transverse sectional view taken along line 4—4 of FIGURE 3, and illustrates a cooperative key and keyway maintaining two tube-like members of the closure in axial alignment.

The outer element 11 comprises a substantially cylindrical outer housing 13 defining an inner liquid chamber 14. The housing 13 is closed at an upper end thereof by an integral end wall 15 having a radially outwardly directed locking rib or bead 16 undercut or grooved at 17. A peripheral skirt 18 of the housing 13 has a gradually downwardly tapering wall structure, as is best illustrated in FIGURE 3 of the drawing, and terminates at a lowermost internally threaded portion 20 for securing the dispensing closure 10 onto the finish of a metal, glass or plastic container C which contains the liquid to be dispensed. While the lower inner portion 20 of the peripheral skirt 18 is threaded, other suitable fastening means such as lugs, ribs, grooves or other conventional means for securing closures to containers may be employed in lieu of the threaded end portion 20 of the closure 10.

A substantially vertical keyway 21 (FIGURES 3 and 4) is formed in the inner surface (unnumbered) of the peripheral skirt 18 adjacent the threaded end portion 20 for a purpose to be described more fully hereafter.

A vent tube 22 and a dispensing tube or pouring spout 23 each form an integral part of the housing 13 and depend downwardly from the end wall 15 into the inner liquid chamber 14. The vent tube 22 and the dispensing tube 23 are each offset from the axis of the housing 13 and each tube terminates above the inner threaded end portion 20 of the peripheral skirt 18. The vent tube 22 is longer and narrower than the dispensing tube 23, as is clearly illustrated in FIGURE 3 of the drawing, and each of the tubes 22 and 23 converge or narrow downwardly from the end wall 15. The vent tube 22 has a portion 24 projecting outwardly beyond the end wall 15 and placing the inner liquid chamber 14 in fluid communication with the atmosphere. The dispensing tube 23 includes a similar portion 25 projecting outwardly of the housing 13 through the end wall 15.

Figure 2:
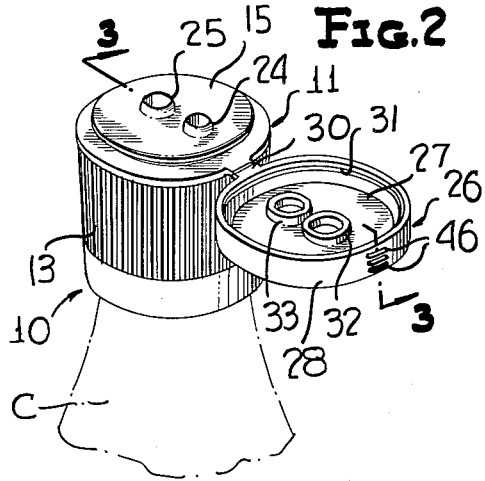
FIGURE 2 is a top perspective view of the dispensing closure and illustrates an open or dispensing position of the closure.

An overcap or covering cap 26 having an end wall 27 and a peripheral skirt 28 is joined to the housing 13 by a flexible integral hinge 30 between the peripheral skirts 18 and 28, and as is best illustrated in FIGURES 2 and 3 of the drawings. A radially inwardly directed bead 31 forming an integral portion of the peripheral skirt 28 of the overcap 26 engages in the groove 17 beneath the outwardly directed bead 16 of the housing 13 to secure the overcap 26 in the position illustrated in FIGURE 1 and the phantom outline position of FIGURE 3 to reseal the closure 10 after a dispensing operation in a manner to be described hereafter.

Two cylindrical continuous wall portions 32 and 33 projecting from the end wall 27 of the overcap 26 define respective recesses 34 and 35. The wall portions 32 and 33 are offset from the axis of the overcap 26 in a manner substantially identical to the offsetting of the tubes 22 and 23. Thus, when the overcap 26 is hinged about the hinge 30 from the position illustrated in FIGURE 2 to the position shown in FIGURE 1 and FIGURE 3, the portions 24 and 25 of the respective tubes 22 and 23 are received in respective recesses 35 and 34 and surrounded by the respective wall portions 33 and 32 to completely seal or reseal the housing after a dispensing operation.

The second member 12 (FIGURES 3 and 5) of the closure 10 comprises a generally circular partition member or wall 36 having a peripheral edge 37 and an upstanding siphon tube 38. The siphon tube 38 includes an innermost cylindrical enlarged chamber 40 surrounding the dispensing tube 23 and opening into the liquid chamber 14 of the housing 13. A portion 41 of the siphon tube 38 projects beneath the partition member 36 and is provided with an opening 42. The opening 42 is in fluid communication with the enlarged cylindrical chamber 40 by a reduced chamber 43 which is also substantially cylindrical.

A filling port or opening 44 is formed in the partition member 36 diametrically opposite to an upstanding key 45 received in the keyway 21 of the peripheral skirt 18. The key 45 and keyway 21 cooperate to accurately align the axially offset dispensing tube 23 with the similarly axially offset siphon tube 38.

The members 11 and 12 are preferably maintained in the assembled position shown in FIGURE 3 of the drawing by friction contact between the peripheral edge 37 of the partition member 36 and an inner surface (unnumbered) of the peripheral skirt 18. If desired, suitable adhesive or other securing means can be used to secure the members 11 and 12 in the assembled position thereof.

With the dispensing closure in the position illustrated in FIGURE 1 of the drawing, a dispensing operation is initiated by first pivoting the overcap 26 about the hinge 30 from the position shown in FIGURE 1 to the position illustrated in FIGURES 2 and 3 of the drawing. To facilitate the unlocking between the bead 31 of the overcap 26 and the groove 17 of the housing 13, the skirt 28 of the overcap 26 is provided with a plurality of outwardly directed axial spaced ribs 46 while the exterior of the peripheral skirt 18 of the housing 13 is provided with a plurality of vertical ribs or serrations 47. The person performing the dispensing operation grasps the housing 13 between his fingers and palm and urges the cap upwardly by applying a force solely with his thumb against the ribs 46, whereby the overcap 26 is opened by a one-hand operation.

The container C is then inverted and the liquid flows into the inner liquid chamber 14 through the opening 44 in the partition member 36. The air in the inner chamber 14 displaced by this liquid is conveyed into the interior of the container C through the chambers 40, 43 and the opening 42 of the siphon tube 38. The liquid continues to rise in the liquid chamber 14, noting that the closure 10 and container C are still inverted. When the liquid pouring into the inner liquid chamber 14 rises above the level of the dispensing tube 23, automatic siphon flow is established and liquid is drawn upwardly between the tube 23 and the siphon tube 38 and outwardly through the dispensing tube 23 until the liquid level drops below the rim of the siphon tube 38 whereupon flow ceases and the liquid level in the liquid chamber 14 again begins to rise whereupon the dispensing cycle is repeated. The time required for the liquid to dispense from the dispensing closure 10 will vary, depending upon such factors as the internal dimension of the dispensing tube 23, the viscosity of the liquid being dispensed, surface tension, etc. However, substantially the same quantity of liquid will be dispensed from the dispensing closure 10 during each repeated dispensing cycle of the closure.

Figure 6:
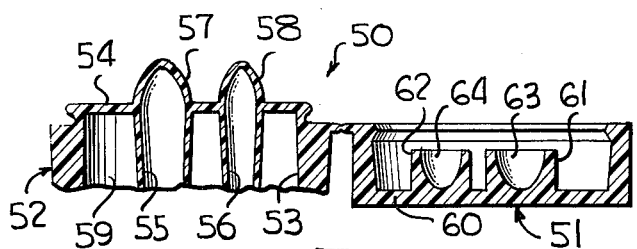
FIGURE 6 is a fragmentary sectional view taken through another dispensing closure on a line substantially identical to the line 3—3 of FIGURE 2, and illustrates a closed vent tube and dispensing tube projecting beyond an end wall of the closure.

Another novel dispensing closure for dispensing a metered quantity of liquid from a container is illustrated in FIGURE 6 of the drawing and is generally designated by the reference numeral 50. The dispensing closure 50 is substantially identical in construction and operation to the dispensing closure 10 of FIGURES 1 through 5 of the drawing, and differs therefrom solely in the construction of an overcap 51 and an upper portion of a housing 52.

The housing 52 of the dispensing closure 50 comprises a peripheral skirt 53 terminating in an end wall 54 from which depends an integral dispensing tube or pouring spout 55 and a vent tube 56 terminating in an inner liquid chamber 59 defined by the housing 52. The tubes 55 and 56 are substantially identical to the respective tubes 23 and 22 (FIGURE 3), but respective portions 57 and 58 projecting outwardly beyond the end wall 54 of the housing 52 are completely closed. Thus, before a dispensing operation of the dispensing closure 50 is initiated in the manner heretofore described in the consideration of the dispensing closure 10, the end portions 57 and 58 must be severed and removed to open the tubes 55 and 56 respectively. To aid in the removal of portions of the end portions 57 and 58, the same may be provided with weakening lines or lines of severance (not shown). In the illustrated form of the invention of FIGURE 6, the portions 57 and 58 are substantially conical in elevation and the weakening lines can be internal or external lines spaced slightly above the end wall 54. By merely grasping each of the end portions 57 and 58 and tearing the same along the circular score lines, the remaining portions of the portions 57 and 58 would correspond to the portions 24 and 25 of the dispensing closure 10 of FIGURES 1 through 5.

The overcap 51 is substantially identical to the overcap 26 and is provided with an end wall 60 from which projects a pair of generally cylindrical wall portions 61 and 62 defining respective generally conical cavities 63 and 64. The wall portions 61, 62, the recesses or cavities 63, 64 and the conical portions 57, 58 are each offset axially in the manner described heretofore in the consideration of the dispensing closure 10. Thus, when the overcap 51 is secured in overlying relationship to the end wall 54 of the housing 52 the portions 57 and 58 of the respective tubes 55 and 56 are each received in the respective recesses 63 and 64 defined by the associated wall portions 61 and 62.

After portions of the proportions 57 and 58 have been removed the remaining portions are resealed by reclosing the overcap 51 in the manner heretofore described and illustrated in FIGURE 3 of the drawing whereby the wall portions 61 and 62 partially surround and reseal the remaining portions of the portions 57 and 58.

The specific quantity or amount of liquid dispensed from either the dispensing closure 10 or the dispensing closure 50 forms no part of this invention nor is the invention to be restricted by the particular liquid dispensed by these closures. For example, the quantity of liquid metered or dispensed by the closures 10 and 50 can be two ounces, a half teaspoon, etc. and the liquid dispensed can be liquor, cough syrup, liquid detergents and soaps, etc.

Where resealing is neither desired nor required, the overcaps 26 and 51 of the respective dispensing closures 10 and 50 can be eliminated. With the elimination of the overcaps 26 and 51, the locking rib and groove constructions are also preferably eliminated but the dispensing tubes and vent tubes 25, 55 and 24 and 56 respectively are preferably closed and provided with weakening lines in the manner heretofore described.

Therefore, while examples of preferred forms of metered dispensing closures are disclosed herein, it is to be understood that variations in the form, construction and material of these closures may be made without departing from the spirit and scope of this invention and as defined in the appended claims.

We claim:

1. A dispensing closure for dispensing a metered amount of liquid comprising an outer housing, said outer housing having an end wall and a peripheral skirt, a vent tube and a dispensing tube in said outer housing opening through said end wall, a partition member extending across the interior of said housing into contact with said skirt, said partition member being spaced from end portions of said vent tube and said dispensing tube, said partition member having a siphon tube surrounding a portion of said dispensing tube and terminating short of said end wall, an opening in said partition member, spaced from said siphon tube and communicating with the interior of said outer housing, and another opening in said partition member opening directly into said siphon tube whereby upon attachment of said closure to a container a measured amount of liquid will be dispensed therefrom upon the inverting of the container.

2. The dispensing closure as defined in claim 1 including means carried by said housing for securing said closure to a container.

3. The dispensing closure as defined in claim 1 wherein said closure is constructed of only two integral plastic members secured together.

4. The dispensing closure as defined in claim 1 wherein the axes of each of said tubes are parallel to each other.

5. A plastic dispensing closure for dispensing a metered amount of liquid comprising an outer housing defining an inner liquid chamber, said housing including an integral end wall and a peripheral skirt, a vent tube and a dispensing tube integrally formed as portions of said outer housing, at least said dispensing tube projecting outwardly of said housing, both said vent tube and said dispensing tube having end portions in said chamber, a partition member extending across the interior of said housing and closing said chamber at an end of said housing opposite said end wall, said partition member having a siphon tube surrounding a portion of said dispensing tube and terminating short of said end wall, an opening in said partition member opening directly into said siphon tube, another opening in said partition member opening into said chamber, and means for securing said dispensing closure to a liquid-carrying container whereby a measured amount of liquid will be dispensed therefrom upon the inverting of the container.

6. The dispensing closure as defined in claim 5 including an integral overcap, said overcap having means for closing said vent tube and said dispensing tube.

7. The dispensing closure as defined in claim 5 wherein said vent tube and dispensing tubes are closed externally of said housing and are adapted to be opened prior to initiating a metered dispensing operation.

8. The dispensing closure as defined in claim 6 wherein said housing, vent tube and dispensing tube are an integral plastic member, and said partition member and siphon tube are an integral plastic member.

9. A plastic dispensing closure for dispensing a metered amount of liquid from a container to which the closure is attached comprising a housing defining an inner liquid chamber, a vent tube and a dispensing tube opening into the chamber, a partition member closing said chamber, a siphon tube surrounding a portion of said dispensing tube, an opening in the partition member opening directly into said siphon tube, another opening in said partition member opening into said chamber, means for securing said dispensing closure to a container, said closure being constructed from a maximum of two integral plastic members joined together, said dispensing tube opening outwardly through an end wall of said housing, said housing carrying an overcap, said overcap including means for closing at least said dispensing tube and means for securing said overcap in overlying relationship to said end wall, and said closure including integral plastic hinge means joining the overcap to the housing.

10. A plastic dispensing closure for dispensing a metered amount of liquid from a container to which the closure is attached comprising a housing having an end wall and a peripheral skirt defining an inner liquid chamber, a vent tube and a dispensing tube opening into and out of said chamber through said end wall, a partition member closing said chamber spaced from said end wall, a siphon tube rising from said partition member and surrounding a portion of said dispensing tube, said siphon tube terminating adjacent said end wall, openings in said partition member opening directly into said siphon tube and into said inner chamber, means for securing said closure to a container, an overcap hingedly connected to said housing, said housing having means engageable with means on said overcap for securing said overcap in overlying relation to said end wall, and means carried by said overcap for sealing both said vent tube and said dispensing tube.

11. The plastic dispensing closure as defined in claim 10 wherein said engageable means are a cooperable lockable bead and groove.

12. The plastic dispensing closure as defined in claim 10 wherein said sealing means is a pair of continuous wall portions adapted to surround the portions of the vent and dispensing tubes projecting beyond said end wall.

13. The plastic dispensing closure as defined in claim 10 wherein said engageable means are a cooperable lockable bead and groove, said sealing means being a pair of continuous wall portions adapted to surround the portions of the vent and dispensing tubes projecting beyond said end wall.

14. The plastic dispensing closure as defined in claim 10 wherein said engageable means are a cooperable lockable bead and groove, said sealing means being a pair of continuous wall portions adapted to surround the portions of the vent and dispensing tubes projecting beyond said end wall, said closure being constructed from a maximum of two integral plastic molded members joined together.

15. A dispensing closure for dispensing a meter amount of liquid comprising: an outer housing, said housing having an end wall and a peripheral skirt; a partition member, said member, skirt, and end wall defining a chamber of said closure; a vent tube and a dispensing tube in said chamber, first end portions of said tubes opening outwardly of said chamber through said end wall and second end portions of said tubes terminating short of said partition; a siphon tube having a first end portion surrounding said second end portion of said dispensing tube; first means placing a second end portion of said siphon tube in fluid communication with the exterior of said chamber through said partition member; and second means placing said chamber in fluid communication with the exterior of said closure through said partition member, said closure being constructed only of two elements, at least said vent and dispensing tubes and end wall being formed integrally with a first of said elements and at least said siphon tube, partition, and said first and second means being formed integrally with a second of said elements, and said closure including means for securing together said two elements.

16. The dispensing closure as defined in claim 21 including an overcap, said overcap, said overcap having means for closing at least the dispensing tube and forming an integral part of one of said two elements.

17. A dispensing closure for dispensing a metered amount of liquid comprising: an outer housing, said housing having an end wall and a peripheral skirt; a partition member, said member, skirt, and end wall defining a chamber of said closure; a vent tube and a dispensing tube in said chamber, first end portions of said tubes opening outwardly of said chamber through said end wall and second end portions of said tubes terminating short of said partition; a siphon tube having a first end portion surrounding said second end portion of said dispensing tube; first means placing a second end portion of said siphon tube in fluid communication with the exterior of said chamber through said partition member; and second means placing said chamber in fluid communication with the exterior of said closure through said partition member, said closure being constructed only of two elements, at least said vent and dispensing tubes and end wall being formed integrally with a first of said elements and at least said siphon tube, partition, and said first and second means being formed integrally with a second of said elements, and said closure including means for snap securing said two elements.

18. The dispensing closure as defined in claim 15 including means carried by said housing for securing said closure to a container.

19. The dispensing closure as defined in claim 15 wherein said two elements are made of a plastic material.

20. The dispensing closure as defined in claim 15 wherein said first means is substantially smaller than said second means.

References Cited by the Examiner

UNITED STATES PATENTS

| 2,442,133 | 5/1948 | Lagarra | 222—416 X |
| 2,778,545 | 1/1957 | Sapia | 222—482 |
| 3,081,008 | 3/1963 | Hester | 222—416 |
| 3,089,626 | 5/1963 | Kubiliunas | 222—562 X |
| 3,117,701 | 1/1964 | Stull | 222—484 X |
| 3,127,064 | 3/1964 | Fairchild | 222—541 X |

FOREIGN PATENTS

| 109,586 | 1/1940 | Australia. |

M. HENSON WOOD, JR., *Primary Examiner.*

RAPHAEL M. LUPO, LOUIS J. DEMBO, *Examiners.*